United States Patent [19]

Iwabuchi et al.

[11] Patent Number: 6,109,101
[45] Date of Patent: Aug. 29, 2000

[54] SPINDLE MOTOR ROTATIONAL UNBALANCE CORRECTION MECHANISM

[75] Inventors: Masanori Iwabuchi; Takeshi Sukegawa; Hirohisa Nakasato, all of Ibaraki, Japan

[73] Assignee: NEC Corporation, Japan

[21] Appl. No.: 08/956,723

[22] Filed: Oct. 23, 1997

[30] Foreign Application Priority Data

Oct. 24, 1996 [JP] Japan .................................. 8-282134

[51] Int. Cl.[7] .................................................. G01M 1/16
[52] U.S. Cl. ........................................ 73/462; 360/99.08
[58] Field of Search .............................. 73/459, 460, 462, 73/461, 66, 1.14, 1.84; 360/98.08

[56] References Cited

U.S. PATENT DOCUMENTS

| | | | |
|---|---|---|---|
| 5,277,063 | 1/1994 | Thomas | 73/457 |
| 5,572,382 | 11/1996 | Kuno | 360/98.08 |
| 5,587,855 | 12/1996 | Kim | 360/97.02 |
| 5,654,875 | 8/1997 | Lawson | 361/685 |
| 5,811,678 | 9/1998 | Hirano | 73/461 |

FOREIGN PATENT DOCUMENTS

| | | | |
|---|---|---|---|
| 6131804 | 5/1994 | Japan | G11B 19/02 |
| 9-161394 | 6/1997 | Japan . | |

*Primary Examiner*—Hezron Williams
*Assistant Examiner*—Richard A. Moller
*Attorney, Agent, or Firm*—Hayes, Soloway, Hennessey, Grossman & Hage, P.C.

[57] ABSTRACT

A spindle motor rotational unbalance correction mechanism has a stand onto which the magnetic disk apparatus is placed, a mounting device for fixing the magnetic disk apparatus to the stand, and a base plate onto which the stand is placed, with an intervening resilient material therebetween. An acceleration sensor detects the vibration of the magnetic disk apparatus when it is operated. A vibrator applies a mechanical shock to the magnetic disk apparatus. A control circuit calculates from a detection signal from the acceleration sensor any shift in position of the magnetic recording medium mounted on the magnetic disk apparatus and controls the supply of electrical driving power to the vibrator in order to correct for the position shift of the magnetic recording medium, thereby providing a high-performance magnetic disk apparatus in which the position shift of the magnetic disk is corrected.

9 Claims, 4 Drawing Sheets

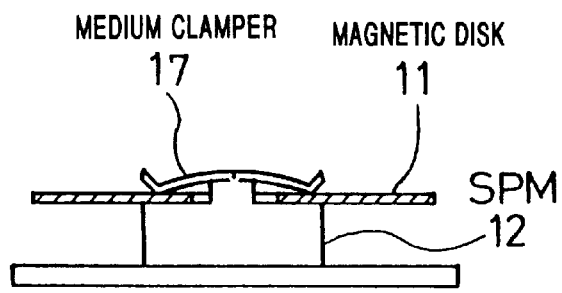
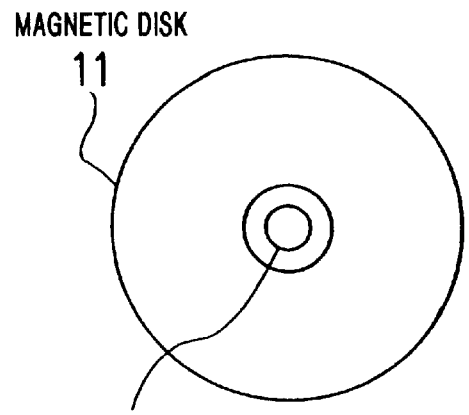
FIG. 3A
BEFORE ACCELERATION STIMULUS
FIG. 3A'
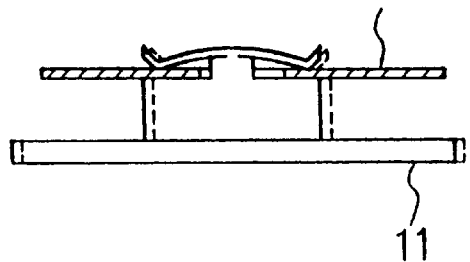
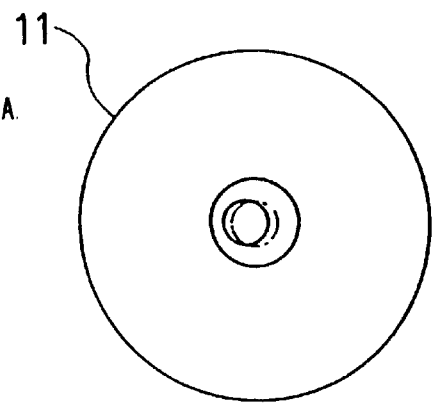
FIG. 3B
WHEN ACCELERATION STIMULUS IS APPLIED
FIG. 3B'
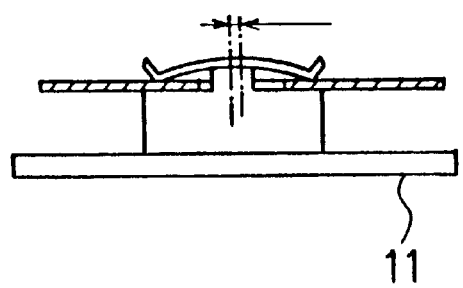
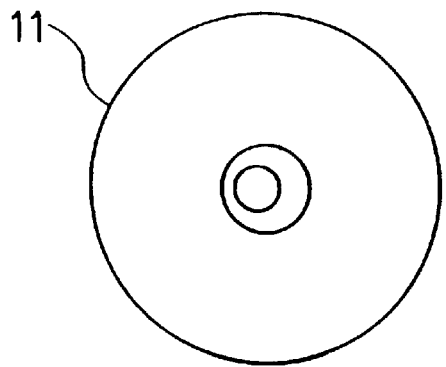
FIG. 3C
AFTER ACCELERATION STIMULUS
FIG. 3C'

CASE IN WHICH DETECTION SIGNAL IS GREATER THAN THE CUT-OFF LEVEL

CASE IN WHICH DETECTION SIGNAL IS LOWER THAN THE CUT-OFF LEVEL

SPINDLE MOTOR ROTATIONAL UNBALANCE CORRECTION MECHANISM

BACKGROUND OF THE INVENTION

1. Field of the Invention

The present invention relates to a spindle motor rotational unbalance correction mechanism, and more specifically to a rotational unbalance correction mechanism for the spindle motor which turns the magnetic recording medium in a magnetic disk apparatus.

2. Description of Related Art

In a spindle motor that is used in a magnetic disk apparatus, to ensure highly reliable recording and playback of data, it is necessary to achieve extremely precise rotation.

Factors causing variation of the rotational precision of a spindle motor largely can be traced to two factors: machining accuracy and assembly accuracy, of elements used in the rotating system.

Of these factors, while the former, which are related to the accuracy of machining of the elements used, demand improvements in accuracy of machining during the manufacturing thereof, the latter factors, related to rotational unbalance, can be corrected either at the time of assembly or after assembly.

For example, there are methods for measuring the amount of rotational unbalance after assembly and then adding a counterbalance which cancels out this unbalance, thereby correcting the unbalance.

The methods of spindle motor unbalance correction used in a magnetic disk apparatus in the past, as noted above, relied on the spindle motor machining accuracy and/or on an adjustment operation performed at the time of assembly or after assembly.

However, with the trend toward higher accuracy in magnetic disk apparatuses, this approach becomes more and more difficult and is accompanied by an increase in cost.

An object of the present invention is to solve the above-noted problem by providing a spindle motor rotating system which is both low-cost and has good rotational balance, thereby achieving a magnetic disk apparatus which has high accuracy and a large storage capacity without only relying on an accuracy of machining and on an accuracy of assembling thereof.

SUMMARY OF THE INVENTION

To achieve the above-noted object, the present invention is a rotational unbalance correction mechanism of a magnetic disk apparatus in which a magnetic disk is temporarily fixed to a spindle motor.

This mechanism has a mounting stand onto which the above-noted magnetic disk apparatus is placed, a mounting device for fixing the above-noted magnetic disk apparatus to the above-noted mounting stand, a base plate onto which the above-noted mounting stand is placed, with an intervening resilient material, an acceleration sensor which detects the vibration of the above-noted magnetic disk apparatus occurring when it is caused to operate, a vibrator which applies a mechanical shock to the above-noted magnetic disk apparatus, and a control circuit which calculates from a detection signal from the above-noted acceleration sensor the shift in position of a magnetic recording medium mounted onto the magnetic disk apparatus and controls the supply of electrical driving power to the vibrator, so as to correct the position shift of the above-noted magnetic recording medium.

The above-noted control circuit performs control so that, based on the phase of the detection signal of the acceleration sensor, the vibrator operates on the magnetic disk apparatus at a prescribed repetition timing, whereby the position shift of the magnetic recording medium can be corrected.

And further in the present invention, the above-noted mounting device has a latching section which latches the above-noted magnetic disk apparatus and a fixture which applies pressure to this latching section so as to hold it fixed.

The above-noted vibrator can be a piezo-electric element, and the above-noted resilient material can be a sheet of rubber or hard synthetic resin.

BRIEF DESCRIPTION OF THE DRAWINGS

FIGS. 3(A)–3(C) are conceptual drawings which illustrate the principle of unbalance correction according to the present invention, this showing the unbalance correction principle as viewed from the mechanical components.

DETAILED DESCRIPTION OF THE PREFERRED EMBODIMENTS

Embodiments of present invention are described below, with reference being made to the relevant accompanying drawings.

Figure 1A:
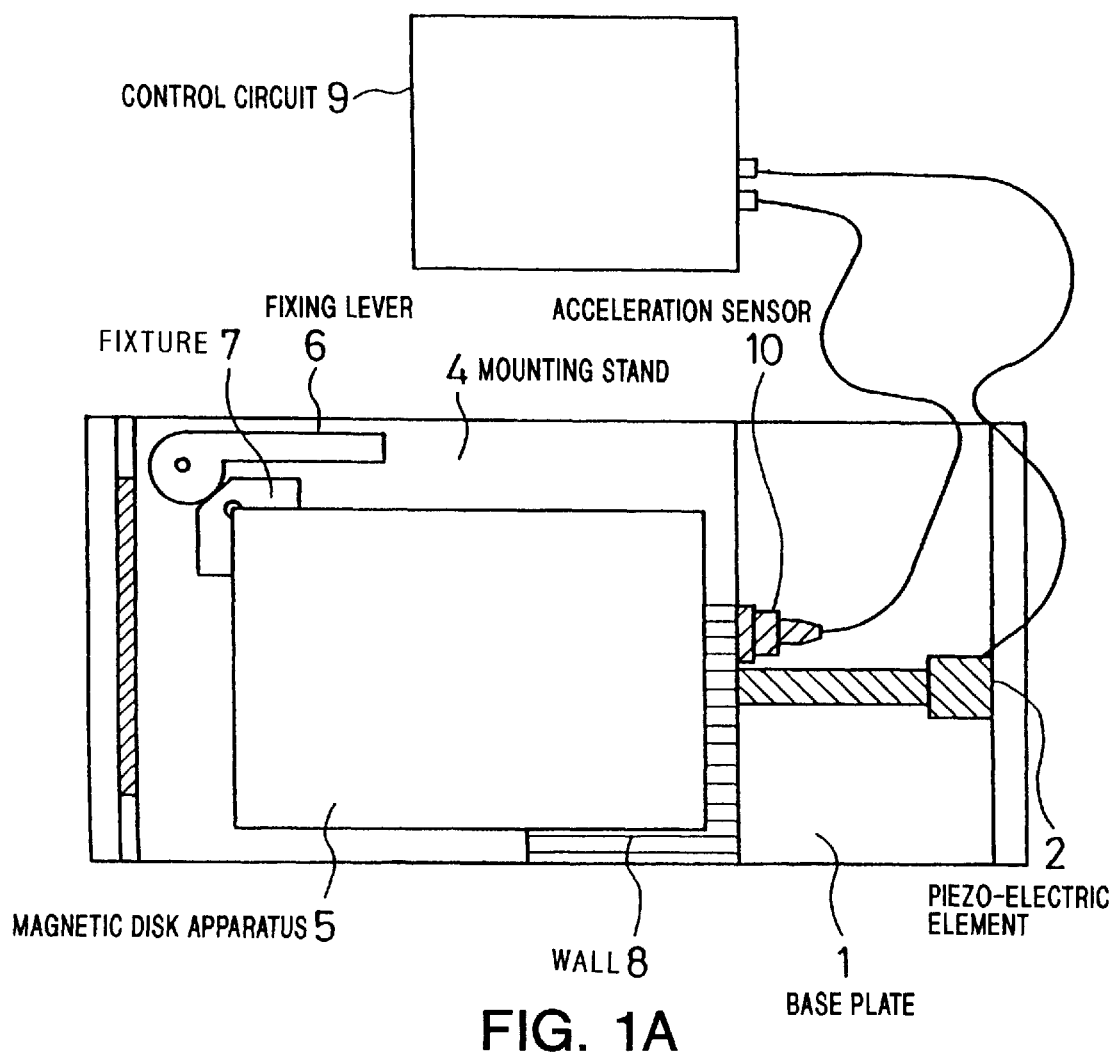
FIG. 1A is a side elevational view.
Figure 1B:
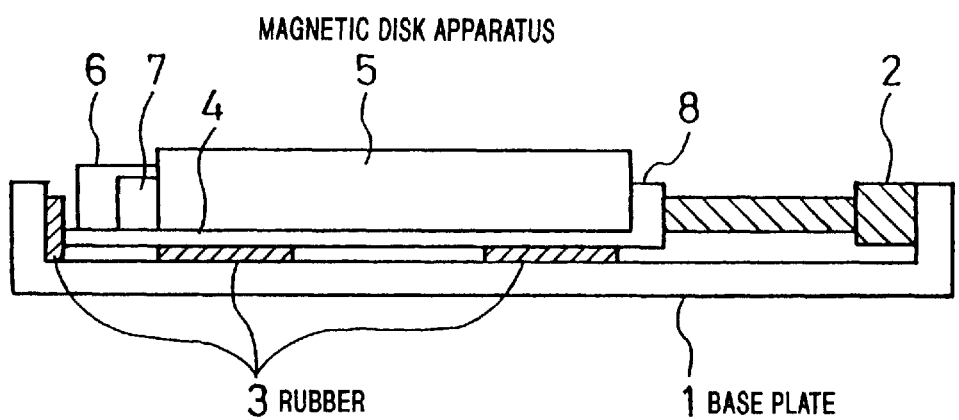
FIG. 1(B) a top plan view which show an embodiment of the present invention.

FIG. 1 shows an embodiment of the present invention, FIG. 1(A) being top plan view thereof, and FIG. 1(B) being a side elevational view thereof.

Referring to FIG. 1, the present invention provides a rotational unbalance correction mechanism for a magnetic disk apparatus in which a magnetic disk is temporarily fixed to a spindle motor, this mechanism having a mounting stand 4 onto which the above-noted magnetic disk apparatus 5 to be corrected is placed, a base plate 1 onto which is placed the mounting stand 4 with a resilient element 3 therebetween, an acceleration sensor 10 which detects vibration of the magnetic disk apparatus 5 when it operates, a piezo-electric device 2 which serves as a vibration stimulus to apply a mechanical shock to the magnetic disk apparatus 5, and a control circuit 9 which calculates from the detection information from the acceleration sensor 10, the position shift of a magnetic disk (not shown in the drawing) that is mounted on the magnetic disk apparatus 5, and which outputs a prescribed command signal to the above-noted shock applying means.

On the mounting stand 4 is provided with a wall 8 that locks in contact with the magnetic disk apparatus 5, and a fixing lever 6 that acts to hold the magnetic disk apparatus 5 by pressing it against wall 8 through a fixture 7.

The control circuit 9 is connected via cables to the acceleration sensor 10 which is fixed on the mounting stand 4 for measuring the vibration and to piezo-electric device 2.

The resilient element 3 that is provided between the base plate 1 and the mounting stand 4 dampen the vibration of the mounting stand 4, can be made of rubber or a soft synthetic resin.

Next, the magnetic disk apparatus having an unbalance that is to be corrected will be described.

The magnetic disk apparatus 5 has a magnetic disk 1 onto which data is recorded, a spindle motor 12 which has a rotating shaft 18 that turns the magnetic disk 11, a medium damper 17 that temporarily holds the magnetic disk to the spindle motor 12, a magnetic head 13 for recording and playback of data to and from the magnetic disk 11, a positioner 15 for holding the magnetic head 13 via an intervening suspension 14, and a voice coil motor for driving the positioner 15.

Figure 2:
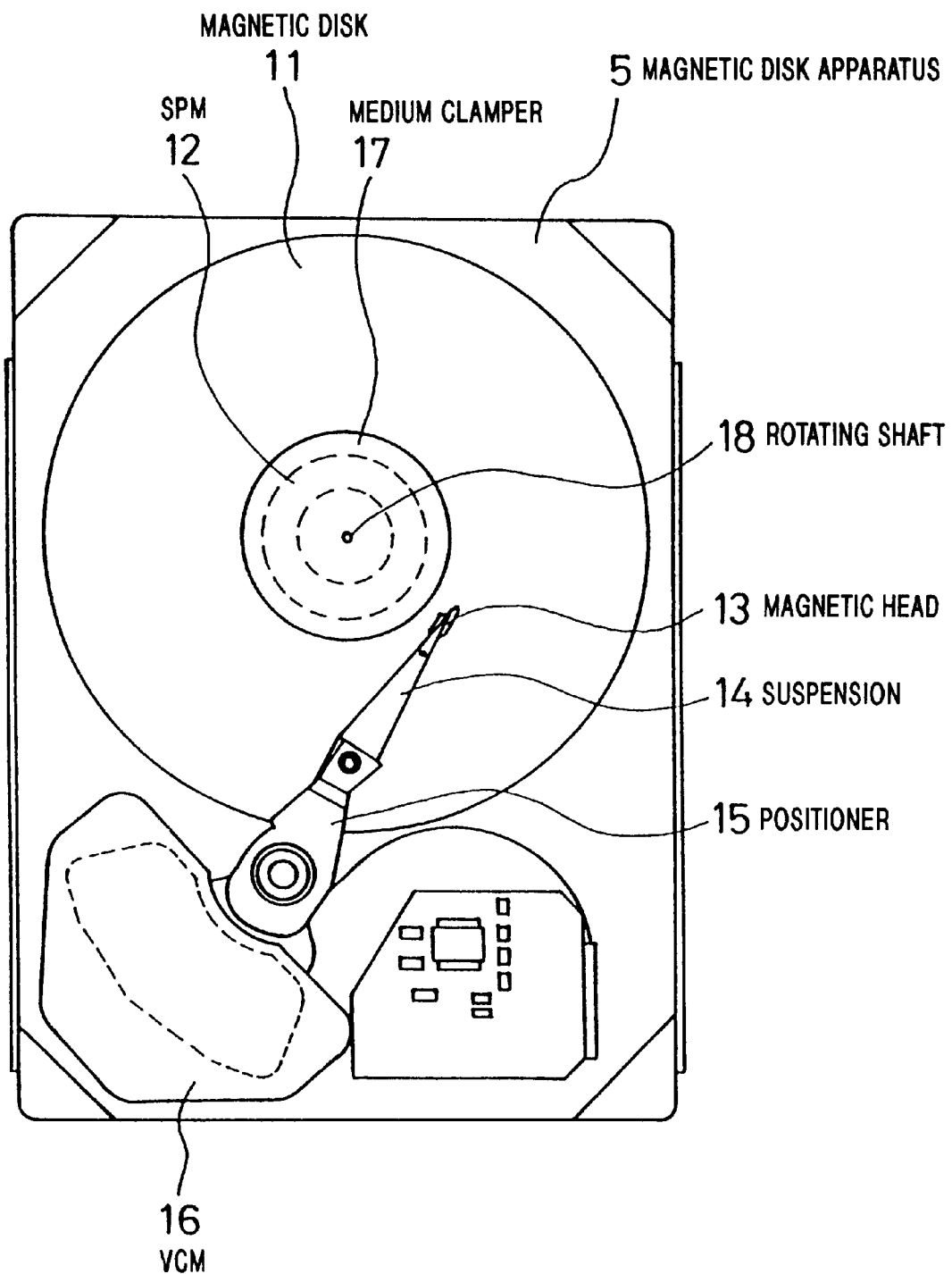
FIG. 2 is a top plan view which shows an example of a magnetic disk apparatus which performs unbalance correction according to the present invention.

In FIG. 2, the example shown is that of a magnetic disk apparatus having an swinging-type positioner.

Next, the principle of unbalance correction of the spindle motor according to the present invention will be described, making reference to FIGS. 3(A)–3(C) and FIGS. 4(A)–4(B).

Figure 4A:
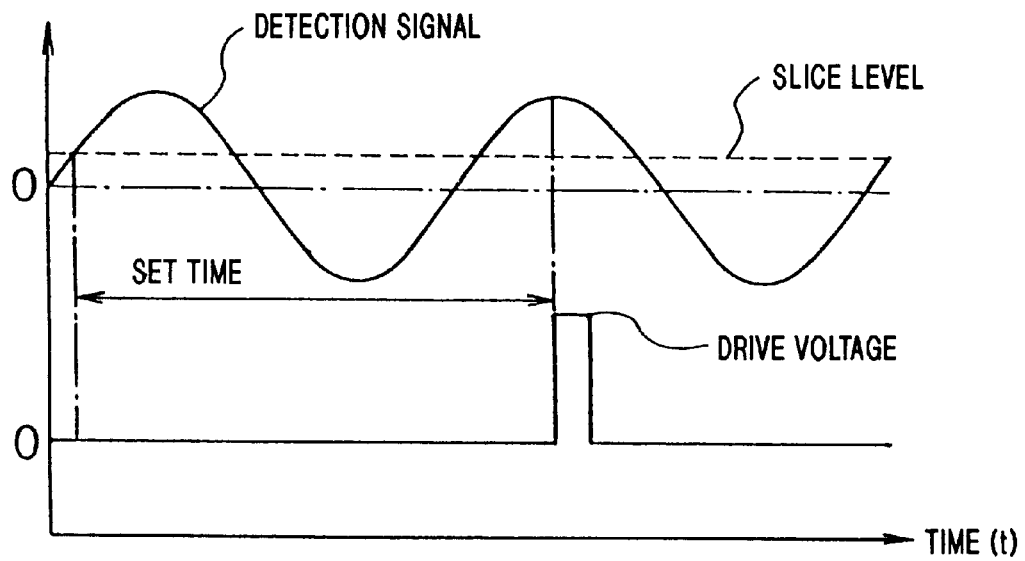
FIGS. 4(A)–4(B) are conceptual drawings which illustrate the principle of unbalance correction according to the present invention, this showing the unbalance correction principle as view from the control side.
Figure 4B:
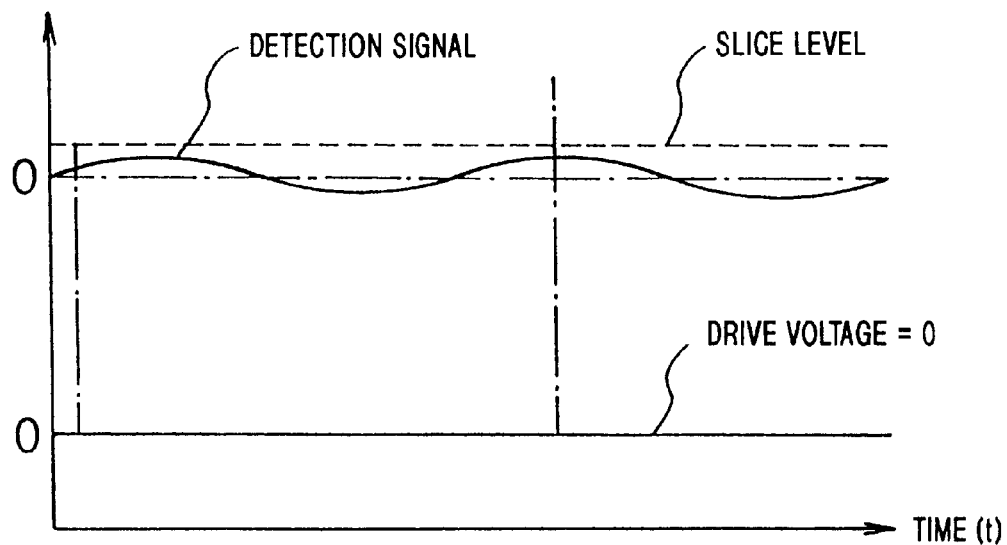

FIGS. 3(A)–3(C) illustrate the principle of mechanical unbalance correction, while FIGS. 4(A)–4(B) illustrate the principle of unbalance correction from the viewpoint of control. Referring to FIGS. 1(A)–1(B) and 2 along with FIGS. 3(A)–3(B) and 4(A)–4(B), the magnetic disk 11 is temporarily fixed to the spindle motor 12 via the medium damper 17.

In doing this, the medium damper 17 holds the magnetic disk 11 by the minimum amount of tightening (temporary tightening) necessary with respect to the rotation of the spindle motor 12, by friction, and the correction operation is begun.

In this temporarily held condition, a spacing is provided between the magnetic disk 11 and the rotating shaft 18 to prevent what is known as a "bite phenomenon" that occurs at the time of assembly.

When the spindle motor 12 is caused to rotate in this temporarily held condition, if there is an unbalance between the spindle motor 12 and the magnetic disk 11, vibration occurs, which is detected by the acceleration sensor 10.

This unbalance-caused vibration is detected as a sinewave having one period per rotation, the amplitude of the sinewave indicating the magnitude of the unbalance, and the phase thereof indicating the location of the unbalance.

In the case in which the detection signal exceeds a set value (hereinafter called the cut off level), a drive voltage is supplied to the piezoelectric element 2 from the control circuit 9 (refer to FIG. 4(A)).

The drive voltage is a pulse voltage with a sharp rate of rise, which causes a sudden movement of the piezo-electric device 2, which strikes the mounting stand and imparts a shock to the magnetic disk apparatus 5.

As a result of this shock, the magnetic disk apparatus 5 is moved suddenly by a minute amount in the opposite direction.

When this occurs, the intrinsic inertia of the rotating magnetic disk 11 acts to maintain it in position, whereupon the magnetic disk 11 is shifted in position with respect to the rotating shaft 18 of the spindle motor 12, which is fixed to the magnetic disk apparatus 5.

Because the shock caused by the piezo-electric device 2 is in the direction that is best suited for correction of the unbalance, by calculating the time from the phase of the detection signal, so as to set the timing thereof, the shift of the shaft by the shock is in the unbalance correction direction.

Next, the spindle motor 12 is rotated and the amount of unbalance is checked.

If the amount of unbalance is greater than the cut-off level, the above-described correction operation is repeated to gradually reduce the amount of unbalance.

If the amount of unbalance is below the cut-off level, the correction operation is stopped (refer to FIG. 4(B)), and the medium damper 17 is permanently fixed in place, this completing the sequence of operations.

An unbalance correction mechanism according to the present invention uses a piezo-electric element that has a fast response as the drive source for an actuator used to apply an acceleration stimulus, and continuously performs measurement of the unbalance and correction thereof during the rotation of the magnetic disk, thereby performing correction unbalance with the magnetic disk mounted to the spindle motor, quickly in the required amount and in the required direction for correction.

Because the unbalance of the rotating body made up of the combination of the spindle motor and the magnetic disk can be ultimately corrected to zero, it is not necessary to have a highly accurate balance of the constituent elements thereof, as in the past, this enabling a reduction in cost of manufacturing the constituent elements.

As explained above, in one of the embodiments of the present invention, it is also preferable that the spindle motor rotational unbalance correction mechanism include a controlling circuit in that at least a cut-off level setting means can be set and with this level, an unacceptable position shift of the magnetic recording medium can be detected.

And further, the controlling circuit further includes at least a comparative means with which the currently detected signal detected by the acceleration sensor, is compared with the cut-off level so as to determine whether or not the unacceptable position shift of the magnetic recording medium exists.

Another aspect of the present invention is a method for correcting a rotational unbalance of a spindle as described below.

In this aspect, the method for correcting a rotational unbalance of a spindle motor on which a magnetic disk apparatus is mounted, employs a mounting stand onto which the magnetic disk apparatus is placed, a mounting device for fixing the magnetic disk apparatus to a mounting stand and a base plate onto which the mounting stand is placed, with an intervening resilient material, wherein the method comprises the steps of, temporarily fixing a magnetic disk to a spindle motor, fixing the magnetic disk apparatus to a mounting stand, mounting the mounting stand on a base plate, applying a mechanical shock to the magnetic disk apparatus by means of a vibrator, detecting the vibration of the magnetic disk apparatus occurring when it is caused to operate, calculating the shift in position of the magnetic recording medium mounted on the spindle motor from a detection signal detected by an acceleration sensor, and supplying electrical driving power to the vibrator to correct the positioned shift of the magnetic recording medium.

In the method for correcting a rotational unbalance of a spindle motor of the present invention, the shift in position of the magnetic recording medium can be calculated based on the phase of the detection signal of the acceleration sensor.

Moreover, the controlled supply of electrical driving power to the vibrator may be repeated at prescribed timing intervals.

Further, in correcting rotational unbalance of a spindle motor in accordance with the present invention, the calculating step and the controlling step may be carried out by comparing the detected signal with a predetermined cut off level and when the detected signal exceeds the cut-off level, it signals an unacceptable position shift of the magnetic recording medium whereupon the vibrator may be driven to correct the position shift of the magnetic recording medium, by supplying electrical driving power thereto until the currently detected signal level falls below the predetermined cut off level.

As described above, using a spindle motor unbalance correction mechanism for a magnetic disk apparatus according to the present invention, it is possible to continuously perform measurement and correction of unbalance with the magnetic disk fixed to the spindle motor, thereby providing a low-cost spindle motor rotating system that has good rotational balance, enabling the achievement of a magnetic disk apparatus which has high accuracy and a large storage capacity.

What is claimed is:

1. A spindle motor rotational unbalance correction mechanism for a magnetic disk apparatus, said rotational unbalance correction mechanism comprising:
   a clamping device for temporarily fixing a magnetic disk to a rotatable spindle motor;
   a stand;
   a mounting device for mounting said magnetic disk apparatus to said stand;
   a base plate onto which said stand is placed, with an intervening resilient material;
   an acceleration sensor for detecting vibration of said magnetic disk apparatus when it is rotatably driven by said spindle motor and for converting said detected vibration into an electrical signal;
   an electrically driven vibrator for applying a mechanical shock to said magnetic disk apparatus; and
   a control circuit for processing said electrical signal from said acceleration sensor and for supplying a charge of electrical energy to said vibrator until the electrical signal from the detected vibration falls to below a predetermined cut-off level.

2. A spindle motor rotational unbalance correction mechanism according to claim 1, wherein said acceleration sensor detects vibration as a sine wave having one period per rotation, wherein the amplitude of the signal is representative of the magnitude of unbalance, and the phase of the sine wave is representative of the location of the unbalance.

3. A spindle motor rotational unbalance correction mechanism according to claim 1, wherein said mounting device includes a latch and fixture for mounting said magnetic disk apparatus to said stand.

4. A spindle motor rotational unbalance correction mechanism according to claim 1, wherein said vibrator comprises a piezo-electric device.

5. A spindle motor rotational unbalance correction mechanism according to claim 1, wherein said intervening resilient material comprises rubber or a synthetic resin.

6. A spindle motor rotational unbalance correction mechanism according to claim 1, Wherein said control circuit includes a comparator for comparing the signal from said acceleration sensor to said cut-off level.

7. A method for correcting rotational unbalance of a spindle motor on which a magnetic disk apparatus is mounted, wherein a magnetic disk apparatus is mounted on a stand by means of a mounting device, which stand in turn is mounted on a base plate with an intervening resilient material therebetween, said method comprising the steps of:
   clamping a magnetic disk temporarily to said spindle motor;
   mounting said magnetic disk apparatus to said stand;
   mounting said mounting stand to said base plate;
   rotatably driving said spindle motor;
   applying a mechanical shock to said magnetic disk apparatus by means of an electrically driven vibrator;
   detecting vibration of said magnetic disk apparatus caused by said mechanical shock while the disk is being rotatably driven, by means of an acceleration sensor;
   converting said detected vibration into electrical signals; and
   processing said electrical signal to control the supply of electrical power to said vibrator until the signals from the detected vibration fall to below a predetermined cut-off level.

8. A method for correcting a rotational unbalance of a spindle motor according to claim 7, and including the step of generating a sine wave signal of said detected vibration, wherein the amplitude of said sine wave is representative of the magnitude of said unbalance, and the phase of said sine wave is representative of the location of said unbalance.

9. A method for correcting a rotational unbalance of a spindle motor according to claim 7, wherein said electrical driving power is supplied to said vibrator at a predetermined frequency.

* * * * *